US012760164B2

(12) United States Patent
Collias et al.

(10) Patent No.: US 12,760,164 B2
(45) Date of Patent: *Oct. 13, 2026

(54) METHOD FOR PRODUCING RECYCLED POLYETHYLENE WITH VIRGIN-LIKE OPTICAL PROPERTIES

(71) Applicant: The Procter & Gamble Company, Cincinnati, OH (US)

(72) Inventors: Dimitris Ioannis Collias, Mason, OH (US); Amy Eichstadt Waun, West Chester, OH (US); James Carmony, Lewisburg, OH (US); John Moncrief Layman, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/643,359

(22) Filed: Apr. 23, 2024

(65) Prior Publication Data

US 2024/0392093 A1 Nov. 28, 2024

Related U.S. Application Data

(63) Continuation of application No. 18/121,677, filed on Mar. 15, 2023, now Pat. No. 11,993,681, which is a continuation of application No. 17/364,984, filed on Jul. 1, 2021, now Pat. No. 11,674,012.

(60) Provisional application No. 63/057,366, filed on Jul. 28, 2020.

(51) Int. Cl.
*C08J 11/08* (2006.01)

(52) U.S. Cl.
CPC ............ *C08J 11/08* (2013.01); *C08J 2323/06* (2013.01)

(58) Field of Classification Search
USPC ............ 521/47
See application file for complete search history.

(56) References Cited

U.S. PATENT DOCUMENTS

| | | | |
|---|---|---|---|
| 5,198,471 A | 3/1993 | Nauman et al. | |
| 5,233,021 A | 8/1993 | Sikorski | |
| 5,739,270 A | 4/1998 | Farmer et al. | |
| 6,369,192 B1 | 4/2002 | Dufresne | |
| 6,555,588 B2 | 4/2003 | Gorski et al. | |
| 7,935,736 B2 | 5/2011 | Maeurer et al. | |
| 8,067,512 B2 | 11/2011 | Kiss et al. | |
| 9,695,259 B2 | 7/2017 | Layman et al. | |
| 9,803,035 B2 | 10/2017 | Layman et al. | |
| 9,834,621 B2 | 12/2017 | Layman et al. | |
| 9,890,225 B2 | 2/2018 | Layman et al. | |
| 9,982,066 B2 | 5/2018 | Layman et al. | |
| 10,435,532 B2 | 10/2019 | Layman | |
| 10,442,912 B2 | 10/2019 | Layman | |
| 10,450,436 B2 | 10/2019 | Layman | |
| 10,465,058 B2 | 11/2019 | Layman | |
| 10,899,906 B2 | 1/2021 | Layman et al. | |
| 10,941,269 B2 | 3/2021 | Layman et al. | |
| 11,008,433 B2 | 5/2021 | Layman et al. | |
| 11,674,012 B2 * | 6/2023 | Collias | C08J 11/08 521/47 |
| 11,993,680 B2 | 5/2024 | Collias | |
| 11,993,681 B2 * | 5/2024 | Collias | B29B 17/02 |
| 11,993,682 B2 | 5/2024 | Collias | |
| 2017/0002111 A1 | 1/2017 | Layman et al. | |
| 2017/0002118 A1 | 1/2017 | Layman | |
| 2017/0002169 A1 | 1/2017 | Layman et al. | |
| 2017/0022346 A1 | 1/2017 | Weeden, Jr. et al. | |
| 2019/0330439 A1 | 10/2019 | Siegl et al. | |
| 2019/0390032 A1 | 12/2019 | Layman | |
| 2022/0033612 A1 | 2/2022 | Collias et al. | |
| 2022/0033613 A1 | 2/2022 | Collias et al. | |
| 2023/0007899 A1 | 1/2023 | Collias et al. | |
| 2023/0235149 A1 | 7/2023 | Collias | |
| 2024/0051186 A1 | 2/2024 | Weiss | |

FOREIGN PATENT DOCUMENTS

| | | | |
|---|---|---|---|
| CN | 101563374 | A | 10/2009 |
| EP | 0849312 | A1 | 6/1998 |
| JP | 2003003010 | A | 1/2003 |
| JP | 2007146045 | A | 6/2007 |
| WO | 2018118575 | A1 | 6/2018 |
| WO | 2018118578 | A1 | 6/2018 |

(Continued)

OTHER PUBLICATIONS

Al-Salem et al."Recycling and recovery routes of plastic solid waste (PSW): A review", Waste Management, vol. 29, accepted on Jun. 4, 2009, pp. 2625-2643.
All Office Actions; U.S. Appl. No. 17/364,984, filed Jul. 1, 2021.
All Office Actions; U.S. Appl. No. 17/364,992, filed Jul. 1, 2021
All Office Actions; U.S. Appl. No. 17/370,029, filed Jul. 8, 2021.
All Office Actions; U.S. Appl. No. 18/116,357, filed Mar. 2, 2023.
All Office Actions; U.S. Appl. No. 18/121,677, filed Mar. 15, 2023.
All Office Actions; U.S. Appl. No. 18/121,706, filed Mar. 15, 2023.

*Primary Examiner* — Terressa Boykin

(74) *Attorney, Agent, or Firm* — Kathleen Y. Carter; James E. Oehlenschlager

(57) ABSTRACT

A method for purifying a contaminated reclaimed polyethylene is provided. The method comprises obtaining the contaminated reclaimed polyethylene, extracting it with a solvent to produce an extracted contaminated reclaimed polyethylene, and then dissolving it in the solvent to produce a first suspension comprising dissolved polyethylene and suspended contaminants. The first suspension is settled to produce a second suspension comprising dissolved polyethylene and suspended remaining contaminants, and the second suspension is purified by contacting it with solid media to produce a third suspension comprising purer polyethylene. Finally, the purer polyethylene is separated from the third suspension and it has virgin-like optical properties.

22 Claims, 2 Drawing Sheets

(56) References Cited

FOREIGN PATENT DOCUMENTS

| | | | |
|---|---|---|---|
| WO | 2018118579 | A1 | 6/2018 |
| WO | 2022026197 | A1 | 2/2022 |

* cited by examiner

METHOD FOR PRODUCING RECYCLED POLYETHYLENE WITH VIRGIN-LIKE OPTICAL PROPERTIES

CROSS REFERENCE TO RELATED APPLICATIONS

This application is a continuation of, and claims priority under 35 U.S.C. § 120 to, U.S. patent application Ser. No. 18/121,677 filed on Jun. 15, 2023, which is a continuation of U.S. patent application Ser. No. 17/364,984 filed on Jul. 1, 2021, now U.S. Pat. No. 11,674,012, granted on Jun. 13, 2023, which claims the benefit, under 35 U.S.C. § 119 (e), of U.S. Provisional Patent Application Ser. No. 63/057,366 filed on Jul. 28, 2020, the entire disclosures of all of which are fully incorporated by reference herein.

FIELD OF THE INVENTION

The present invention generally relates to a method for purifying contaminated reclaimed polyethylene (crPE) through the use of a pressurized solvent, and extraction and dissolution steps. More specifically, this invention relates to a method for purifying crPE, such as post-consumer recycled PE (PCR PE) and post-industrial recycled PE (PIR PE), to produce recycled PE with virgin-like optical properties (vlPE). Any of the various grades of contaminated reclaimed polyethylene, such as high-density polyethylene (crHDPE), low-density polyethylene (crLDPE), linear low-density polyethylene (crLLDPE), and their mixtures, can be used as feedstocks in the present invention to produce vlPE.

BACKGROUND OF THE INVENTION

Polymers, especially synthetic plastics, are ubiquitous in daily life due to their relatively low production costs and good balance of material properties. Synthetic plastics are used in a wide variety of applications, such as packaging, automotive components, medical devices, and consumer goods. To meet the high demand of these applications, tens of millions of tons of synthetic plastics are produced globally on an annual basis. The overwhelming majority of synthetic plastics are produced from increasingly scarce fossil sources, such as petroleum and natural gas. Additionally, the manufacturing of synthetic plastics from fossil sources consumes a lot of energy and produces $CO_2$ as a by-product.

The ubiquitous use of synthetic plastics has consequently resulted in millions of tons of plastic waste being generated every year. While the majority of plastic waste is landfilled via municipal solid waste programs (about 79% globally) or incinerated for energy recovery (about 12% globally), a significant portion of plastic waste is found in the environment as litter, which is unsightly and potentially harmful to ecosystems. Plastic waste is often washed into river systems and ultimately out to sea.

Plastics recycling has emerged as one solution to mitigate the issues associated with the wide-spread usage of plastics, their end-of-life, and their leakage to the environment. Recovering and re-using plastics diverts waste from landfills and reduces the demand for virgin plastics made from fossil-based resources, which consequently reduces greenhouse gas emissions. In developed regions, such as the United States and the European Union, rates of plastics recycling are increasing due to greater awareness by consumers, businesses, and industrial manufacturing operations. The majority of recycled materials, including plastics, are mixed into a single stream which is collected and processed by a material recovery facility (MRF). At the MRF, materials are sorted, washed, and packaged for resale. Plastics can be sorted into individual materials, such as high-density polyethylene (HDPE), poly (ethylene terephthalate) (PET), or mixed streams of other common plastics, such as polypropylene (PP), low-density polyethylene (LDPE), poly (vinyl chloride) (PVC), polystyrene (PS), polycarbonate (PC), and polyamides (PA). The single or mixed streams can then be further sorted, washed, and reprocessed into pellets that are suitable for re-use in plastics processing, for example blow and injection molding.

Though recycled plastics are sorted into predominately uniform streams and are washed with aqueous and/or caustic solutions, the final reprocessed pellets often remain highly contaminated with unwanted waste impurities, such as spoiled food residue and residual perfume components. In addition, recycled plastic pellets, except for those from recycled beverage containers, are darkly colored due to the mixture of dyes and pigments commonly used to color plastic articles. While there are some applications that are insensitive to color and contamination (for example, black plastic paint containers and concealed automotive components), the majority of applications require non-colored pellets. The need for high quality, "virgin-like" recycled resin, is especially important for food and drug contact applications, such as food packaging. In addition to being contaminated with impurities and mixed colorants, many recycled resin products are often heterogeneous in chemical composition and may contain a significant amount of polymeric contamination, such as recycled polypropylene contamination in polyethylene and vice versa.

Mechanical recycling is the process of converting recycled plastic waste into a re-usable form for subsequent manufacturing. A more detailed review of mechanical recycling and other plastics recovery processes are described in Al-Salem, S. M., et al., *Waste Management,* 29(10) (2009), 2625-2643. While advances in mechanical recycling technology have improved the quality of recycled polymers to some degree, there are fundamental limitations of mechanical decontamination approaches, such as the physical entrapment of pigments within a polymer matrix. Thus, even with the improvements in mechanical recycling technology, the dark color and high levels of chemical contamination in currently available recycled plastic waste prevents broader usage of recycled resins by the plastics industry.

To overcome the fundamental limitations of mechanical recycling, there have been many methods developed to purify contaminated polymers, such as chemical recycling and solvent-based recycling. The latter methods use solvents to decontaminate and purify polymers. The use of solvents enables the extraction of impurities and the dissolution of polymers, which further enables alternative separation technologies. U.S. Pat. No. 7,935,736 discloses a method for recycling polyester from a waste stream using a solvent to dissolve the polyester prior to cleaning. The patent also describes the need to use a precipitant to recover the polyester from the solvent.

U.S. Pat. No. 6,555,588 discloses a method to produce a polypropylene blend from a plastic mixture comprising other polymers. The patent describes the extraction of contaminants from a polymer at a temperature below the dissolution temperature of the polymer in the selected solvent, such as hexane, for a specified residence period. The patent further describes increasing the temperature of the solvent (or adding a second solvent) to dissolve the polymer prior to filtration. Furthermore, the patent describes the use of shearing or flow to precipitate polypropylene from solution. The polypropylene blend described in the patent contained polyethylene contamination up to 5.6 wt %.

European Patent Application No. 849,312 discloses a process to obtain purified polyolefins from a polyolefin-containing plastic mixture or a polyolefin-containing waste. The patent application describes the extraction of polyolefin mixtures or wastes with a hydrocarbon fraction of gasoline or diesel fuel with a boiling point above 90° C. at temperatures between 90° C. and the boiling point of the hydrocarbon solvent. The patent application further describes contacting a hot polyolefin solution with bleaching clay and/or activated carbon to remove foreign components from the solution. Furthermore, the patent application describes cooling the solution to temperatures below 70° C. to crystallize the polyolefin and then removing the solvent by a variety of methods, such as heating the polyolefin above its melting point, evaporating the solvent in a vacuum, passing a gas stream through the polyolefin precipitate, or extraction of the solvent with an alcohol or ketone that boils below the melting point of the polyolefin.

U.S. Pat. No. 5,198,471 discloses a method for separating polymers from a physically commingled solid mixture (for example, waste plastics) containing a plurality of polymers using a solvent at a first lower temperature to form a first single phase solution and a remaining solid component. The patent further describes heating the solvent to higher temperatures to dissolve additional polymers that were not solubilized at the first lower temperature, and the filtration of insoluble polymer components.

U.S. Pat. No. 5,233,021 discloses a method of extracting pure polymeric components from a multi-component structure (for example, waste carpets) by dissolving each component at an appropriate temperature and pressure in a supercritical fluid and then varying the temperature and/or pressure to extract particular components in sequence. However, similar to the '471 patent, the '021 patent only discloses filtration of undissolved components.

U.S. Pat. No. 5,739,270 discloses a method and apparatus for continuously separating a polymer component of a plastic from contaminants and other components of the plastic using a co-solvent and a working fluid. The co-solvent at least partially dissolves the polymer and the second fluid (that is in a liquid, critical, or supercritical state) solubilizes components from the polymer and precipitates some of the dissolved polymer from the co-solvent. The patent further discloses the step of filtering the thermoplastic-co-solvent (with or without the working fluid) to remove particulate contaminants, such as glass particles.

The known solvent-based methods to purify contaminated polymers, as described above, do not produce polymer with virgin-like optical properties. In the previous methods, co-dissolution and thus cross contamination of other polymers often occurs. If an adsorbent is used, a filtration and/or centrifugation step is often employed to remove the used adsorbent from solution. In addition, isolation processes to remove solvent, such as heating, vacuum evaporation, and/or precipitation using a precipitating chemical, are used to produce a polymer free of residual solvent.

Accordingly, there is a need for a purification technology that can be fed with contaminated polyethylene waste and produce polyethylene that has "virgin-like" optical properties using simple and few unit operations, and employing a solvent that is readily and economically available.

SUMMARY OF THE INVENTION

In one embodiment of the present invention, a method for purifying contaminated reclaimed polyethylene (crPE) to produce recycled polyethylene with virgin-like optical properties (vlPE) is presented. The method comprises: a) Obtaining said crPE; wherein said crPE is selected from the group consisting of post-consumer recycled (PCR) polyethylene, post-industrial recycled (PIR) polyethylene, and combinations thereof; b) Obtaining a solvent; wherein said solvent and said crPE form a one-phase solution at a temperature and at a pressure higher than the cloud point pressure corresponding to said temperature; wherein said cloud point pressure: (i) corresponds to a solution of said crPE in said solvent at about 5 wt % concentration; (ii) is a monotonically increasing function of temperature; (iii) exceeds the following pressure levels: about 700 psig (48.3 barg) at about 120° C., about 1,150 psig (79.3 barg) at about 140° C., about 1,450 psig (100 barg) at about 160° C., and about 1,800 psig (124.1 barg) at about 180° C.; (iv) includes smooth extrapolations at temperatures lower than about 120° C. and higher than about 180° C.; and (v) includes smooth interpolations at temperatures between about 120° C. and about 180° C.; c) Extracting said crPE with said solvent at an extraction mass concentration of at least about 1 wt %, at an extraction temperature, and at an extraction pressure; wherein said extraction temperature is from about 120° C. to about 260° C.; wherein said extraction pressure is below the cloud point pressure corresponding to said extraction temperature; and wherein an extracted contaminated reclaimed polyethylene (ecrPE) is produced; d) Dissolving the ecrPE in said solvent at a dissolution mass concentration of at least about 1 wt %, at a dissolution temperature, and at a dissolution pressure; wherein said dissolution temperature is from about 120° C. to about 260° C.; wherein said dissolution pressure is above the cloud point pressure corresponding to said dissolution temperature; and wherein a first suspension comprising dissolved polyethylene (PE) and suspended particulate contaminants is produced; e) Settling said first suspension at a settling temperature and at a settling pressure; wherein said settling temperature is from about 120° C. to about 260° C.; wherein said settling pressure is above the cloud point pressure corresponding to said settling temperature; and wherein a second suspension comprising dissolved PE and suspended remaining particulate contaminants is produced; f) Purifying said second suspension at a purification temperature and at a purification pressure by contacting said second suspension with solid media; wherein said purification temperature is from about 120° C. to about 260° C.; wherein said purification pressure is above the cloud point pressure corresponding to said purification temperature; and wherein a third suspension comprising purer PE is produced; and g) Separating said purer PE from said third suspension; and wherein said purer PE is said vlPE.

In another embodiment of the present invention, a method for purifying crPE to produce vlPE is presented. The method comprises: a) Obtaining said crPE; wherein said crPE is selected from the group consisting of post-consumer recycled (PCR) polyethylene, post-industrial recycled (PIR) polyethylene, and combinations thereof; b) Extracting said crPE with n-pentane at an extraction mass concentration of about 3.5 wt %, at an extraction temperature of about 205° C., and at an extraction pressure of about 1,900 psig (131 barg) to produce an ecrPE; c) Dissolving the ecrPE in n-pentane at a mass concentration of about 3.5 wt %, at a dissolution temperature of about 140° C., and at a dissolution pressure of about 1,900 psig (131 barg) to produce a first suspension comprising dissolved polyethylene (PE) and suspended particulate contaminants; d) Settling said first suspension at about 140° C. and at about 1,900 psig (131 barg) to produce a second suspension comprising dissolved PE and suspended remaining particulate contaminants; e) Purifying said second suspension by contacting said second suspension with solid media at about 140° C. and at about 1,900 psig (131 barg) to produce a third suspension comprising purer PE; wherein said purification comprises contacting said second suspension with said solid media in a candle filter followed by an axial flow filter; and wherein said solid media of said candle filter comprise diatomaceous earth and said solid media of said axial flow filter comprise activated alumina; and f) Separating said purer PE from said third suspension; wherein said purer PE is said vlPE; and wherein said vlPE has L* greater than about 82, a* greater than about −3, b* less than about 5, and Y less than about 40%.

DETAILED DESCRIPTION OF THE INVENTION

I. Definitions

Figure 1:
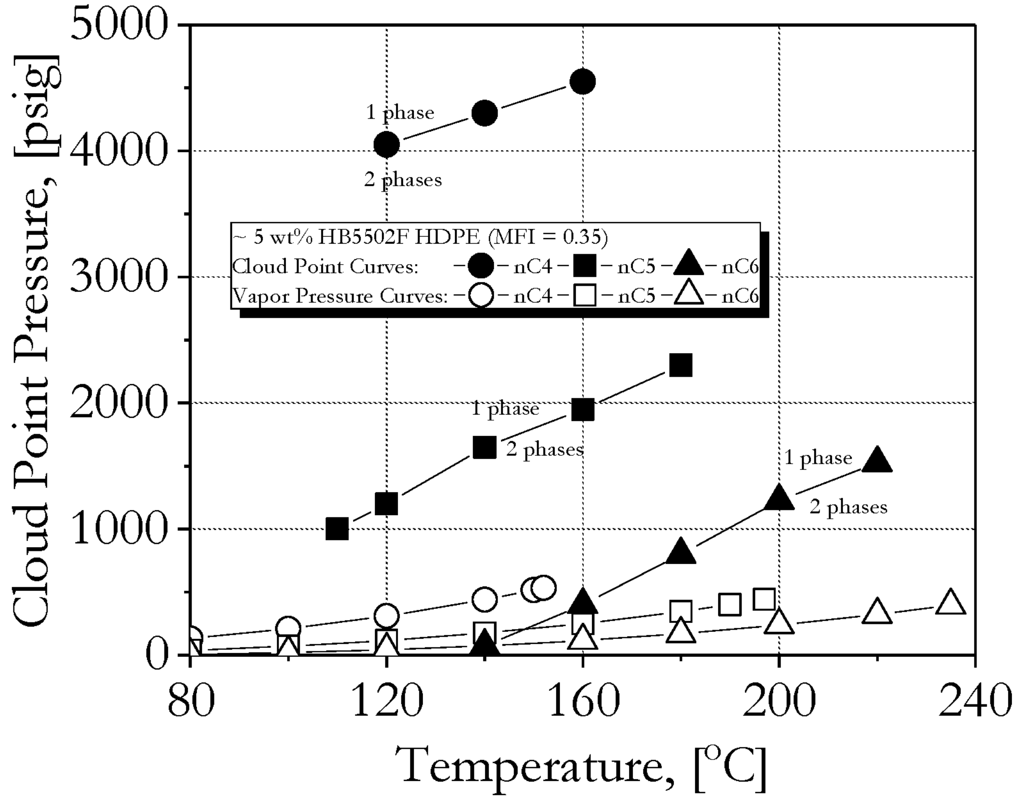
FIG. 1 is a diagram of cloud point pressure curves of solutions of HDPE in n-butane, n-pentane, and hexanes. The vapor pressure curves of the 3 solvents are also included. Each solution contains about 5 wt % of Formolene® HB5502F HDPE (Formosa Plastics Corp., Livingston, NJ), which is a blow molding grade and has a melt flow index (MFI) of about 0.35 g/10 min.

As used herein, the term "reclaimed polyethylene" refers to a polyethylene that was used for a previous purpose and then collected for the purpose of recycling.

As used herein, the term "contaminated reclaimed polyethylene" (crPE) refers to a reclaimed polyethylene that was contaminated with particulate contaminants and other contaminants. Non-limiting examples of other contaminants are odors, flavors, dyes, surfactants, surface prints, etc.

As used herein, the term "recycled polyethylene" refers to a product of a recycling process that has been fed with reclaimed polyethylene.

As used herein, the term "post-consumer recycled" (PCR) material refers to a material in a waste stream that an end consumer has used and disposed of.

As used herein, the term "post-industrial recycled" (PIR) material refers to a material in a waste stream of a manufacturing plant that is produced after the manufacture of a good or product. Non-limiting examples of PIR materials are manufacturing wastes, such as industrial scrap and part trimmings.

As used herein, the term "solvent" refers to a material that dissolves polyethylene and may also be at, near, or above its critical temperature and critical pressure (critical point). It is well known to those having ordinary skill in the art that substances above their critical point are known as "supercritical fluids" which do not have the typical physical properties (i.e., density) of a liquid.

As used herein, the term "dissolved" refers to the partial (at a minimum) incorporation of a polyethylene solute in a solvent at the molecular level.

As used herein, the term "standard boiling point" refers to the boiling temperature at an absolute pressure of exactly 100 kPa (1 bar, 14.5 psia, 0.9869 atm) as established by the International Union of Pure and Applied Chemistry (IUPAC).

As used herein, the term "suspension" refers to a suspension of particulate contaminants in a polyethylene solution.

As used herein, the term "particulate contaminants" refers to particulate matter that is present throughout the bulk or surface of polyethylene articles. These particulate contaminants can be additives that suppliers typically incorporate into polyethylene to protect and/or extend its life, contaminants left onto the polyethylene articles from their consumer use, contaminants attached to the polyethylene articles during their disposal in the waste stream and reclaiming, etc. Non-limiting examples of particulate contaminants, that suppliers incorporate into polyethylene, are antioxidants (either primary or secondary), anti-blocking agents, anti-stat agents, UV stabilizers, flame retardants, and colorants.

As used herein, the term "solid media" refers to media, in particulate, woven, or non-woven shapes, used in filtration operations. These operations can be axial flow or radial flow, or other operations.

As used herein, the term "purer polyethylene" refers to a polyethylene having fewer contaminants relative to the same polyethylene prior to a purification step.

As used herein, the term "extraction" refers to the process step of transferring solute species from a liquid phase (or solid matrix) and across a phase boundary to a separate immiscible liquid phase.

As used herein, the term "extracted" refers to a material having fewer solute species relative to the same material prior to an extraction step.

As used here, the term "extracted reclaimed polyethylene" refers to a reclaimed polyethylene having fewer solute species relative to the same reclaimed polyethylene prior to an extraction step.

As used herein, the term "virgin-like" material means a material that has essentially similar properties and composition to a virgin material.

As used herein, the term "virgin-like optical properties" refers to L* (CIE (Commission Internationale de l'Eclairage) lightness axis; 0 is black and 100 is white) greater than about 82, a* (CIE red-green axis; negative value is green, positive value is red, and 0 is neutral) greater than about −3, b* (CIE blue-yellow axis; negative value is blue, positive value is yellow, and 0 is neutral) lower than about 5, and Y (CIE contrast ratio opacity) lower than about 40%.

As used herein, the term "hexanes" refers to a blend of hexane isomers, such as normal hexane (at least 45 vol %, and typically, about 53 vol %), iso hexane (2-methylpentane, 3-methylpentane, and 2,3-dimethylbutane), and neo hexane (2,2-dimethylbutane).

II. Feedstock—Waste Polyethylene

Unexpectedly, it has been found that solvents which form solutions of waste polyethylene and have a cloud point pressure that exceeds a threshold pressure at a certain temperature generate purer polyethylene with virgin-like optical properties. Under these conditions, these solvents are typically considered poor solvents for polyethylene. On the other hand, solvents which form solutions of waste polyethylene and have a cloud point pressure that is lower than a threshold pressure at a certain temperature cannot generate purer polyethylene with virgin-like optical properties. Under these conditions, these solvents are considered θ or good solvents.

For polyethylene, non-limiting examples of poor solvents are normal butane (n-butane) and normal pentane (n-pentane), and non-limiting examples of θ or good solvents are normal hexane (n-hexane) and hexanes. For example, at 160° C., the cloud point pressure of a solution of about 5 wt % polyethylene in n-pentane (poor solvent) is about 1,950 psig (134.4 barg) and that in n-butane (poor solvent) is about 4,550 psig (313.7 barg). In another example, at 160° C., the cloud point pressure of a solution of about 5 wt % polyethylene in hexanes (θ or good solvent) is about 380 psig (26.2 barg). As the number of carbon atoms in an alkane solvent increases, the alkane becomes a better solvent (e.g., moves from poor to θ and then to good solvent).

Not wishing to be bound by any theory, applicants believe that key to the conversion of waste polyethylene to purer polyethylene with virgin-like optical properties is the quality of the solvent. If the solvent is a poor solvent, then the polyethylene molecules are collapsed into dense coils (like spheres, with solvent molecules essentially excluded from these coils). The radius of gyration, $R_g$, of these dense coils is on the order of a few nm for a 100,000 Da polyethylene molecule, and the expectation is that these dense coils do not interact with the suspended particulate contaminants. If the solvent is a θ solvent, then the polyethylene molecules are expanded to some degree assuming random walk conformation and include solvent molecules amongst them. The $R_g$ of these expanded molecules is about one order of magnitude higher than that of the dense coils in the poor solvent and about a few hundreds of nm for a 100,000 Da polyethylene molecule. Also, the expectation is that some of these expanded polymer molecules are adsorbed onto the surface of the suspended particulate contaminants and thus inhibit their removal by the filtration media. Finally, if the solvent is a good solvent, then the polyethylene molecules are rather expanded assuming self-avoiding walk conformation and include a lot of solvent molecules amongst them. The $R_g$ is about one order of magnitude higher than that of the molecules in the θ solvent and about a thousand nm for a 100,000 Da polyethylene molecule. Also, the expectation is that some of these polyethylene molecules are adsorbed onto the surface of the suspended particulate contaminants and thus inhibit their removal by the filtration media.

The feedstock in the present invention is a contaminated reclaimed polyethylene (crPE). In one embodiment of the present invention, a method for purifying crPE to produce recycled polyethylene with virgin-like optical properties (vlPE) comprises obtaining said crPE. In another embodiment of the present invention, the crPE is selected from the group consisting of post-consumer recycled (PCR) polyethylene, post-industrial recycled (PIR) polyethylene, special waste stream polyethylene, and combinations thereof. In yet another embodiment of the present invention, the crPE is selected from the group consisting of PCR polyethylene, PIR polyethylene, and combinations thereof. In one embodiment of the present invention, a method for purifying crPE to produce vlPE comprises obtaining said crPE, wherein said crPE is selected from the group consisting of PCR polyethylene, PIR polyethylene, and combinations thereof.

Non-limiting examples of sources of PCR polyethylene are curbside recycle streams (where end-consumers place used polymers from packages and products into a designated bin for collection by a waste hauler or recycler) and in-store “take-back” programs (where the consumer brings waste polymers into a store and places the waste polymers in a designated collection bin). A non-limiting example of sources of PIR polyethylene is waste polymer streams produced during the manufacture or shipment of a good or product that are collected as unusable material by the manufacturer (i.e., trim scraps, out of specification material, and start-up scrap). Non-limiting examples of sources of special waste stream polyethylene are recycling of electronic waste (also known as e-waste); recycling of automobiles; and recycling of used carpeting and textiles.

For the purposes of the present invention, the crPE is a homogenous composition of an individual polyethylene or a mixture of several different polyethylene compositions. Non-limiting examples of polyethylene compositions are homopolymers and copolymers of ethylene, such as HDPE, LDPE, LLDPE, copolymers of ethylene and alpha-olefins, and other polyethylene polymers that may be apparent to those having ordinary skill in the art.

Non-limiting examples of contamination in crPE are pigments, dyes, process aids, stabilizing additives (e.g., antioxidants), fillers, flame retardants, and other performance additives that were added to the polyethylene during polymerization or conversion of the original polyethylene to the final form of an article and are necessary for marketing, branding, processability, and/or end use performance. Non-limiting examples of pigments are organic pigments, such as copper phthalocyanine; inorganic pigments, such as titanium dioxide; and other pigments that may be apparent to those having ordinary skill in the art. A non-limiting example of an organic dye is Basic Yellow 51. Non-limiting examples of process aids are antistatic agents, such as glycerol monostearate; and slip-promoting agents, such as erucamide. A non-limiting example of an antioxidant is octadecyl-3-(3,5-di-tert.butyl-4-hydroxyphenyl)-propionate (BASF’s Irganox® 1076). Non-limiting examples of fillers are calcium carbonate, talc, and glass fibers. The crPE may also contain odors, surface prints, paper labels, adhesives for labels, dirt, and volatile and non-volatile organic compounds. In addition, contaminants may result from interaction with products, e.g., polyethylene packaging materials that contain cleaning mixtures (e.g. limonene, surfactants, etc.), food (e.g. various organics), etc. The contamination may be particulate (e.g. fillers, dirt, particulate pigments, etc.) or non-particulate (e.g. dyes, odors, surfactants, volatile organic compounds, etc.).

In one embodiment of the present invention, said crPE comprises contaminated reclaimed high-density polyethylene (crHDPE). In another embodiment of the present invention, said crPE comprises contaminated reclaimed low-density polyethylene (crLDPE). In yet another embodiment of the present invention, said crPE comprises contaminated reclaimed linear low-density polyethylene (crLLDPE). In even yet another embodiment of the present invention, said crPE comprises a mixture of crLDPE and crLLDPE.

In one embodiment of the present invention, said crPE is contaminated reclaimed high-density polyethylene (crHDPE). In another embodiment of the present invention, said crPE is contaminated reclaimed low-density polyethylene (crLDPE). In yet another embodiment of the present invention, said crPE is contaminated reclaimed linear low-density polyethylene (crLLDPE). In even yet another embodiment of the present invention, said crPE is a mixture of crLDPE and crLLDPE.

III. Solvent

Polyethylene solutions exhibit a cloud point curve, which is their liquid-liquid equilibrium curve. A typical method to measure a cloud point curve is with the use of a view cell, as this is well known to those skilled in the art. A solution of a certain amount of polyethylene in a solvent is prepared at a specified temperature and high pressure where the solution is in a one-phase regime. Then, under stirring, the temperature is held constant and the pressure is lowered. At some pressure, called cloud point pressure, the solution becomes cloudy and it enters the two-phase regime, i.e., a heavy phase (also called the raffinate (RAF) phase, which contains high concentration of polyethylene in the solvent) and a light phase (also called the extract (EXTR) phase, which contains a very low concentration of polyethylene in the solvent). From the two-phase regime, if the pressure is increased then the two-phase system will become a clear solution (one-phase regime) as the pressure crosses the cloud point pressure at that temperature.

Typical examples of cloud point pressure curves are shown in FIG. 1 with solutions of a virgin HDPE in n-butane, n-pentane, and hexanes at about 5 wt % concentration. Other concentrations of HDPE in solvents or concentrations of various polyethylene grades (such as, HDPE, LDPE, and LLDPE) in solvents could shift these cloud point curves shown in FIG. 1 in the pressure/temperature space. For the purposes of the present invention, we consider a solution with about 5 wt % virgin HDPE Formolene® HB5502F in a solvent as the reference solution and 160° C. temperature as the reference temperature.

The solvent of the present invention produces a solution with polyethylene at about 5 wt % concentration that has a cloud point pressure exceeding a certain level. In one embodiment of the present invention, the cloud point pressure of a solution of polyethylene at about 5 wt % concentration exceeds about 1,450 psig (100 barg) at about 160° C. In another embodiment of the present invention, the cloud point pressure of a solution of polyethylene at about 5 wt % concentration exceeds about 1,950 psig (134.4 barg) at about 160° C. In yet another embodiment of the present invention, the cloud point pressure of a solution of polyethylene at about 5 wt % concentration exceeds about 3,000 psig (206.8 barg) at about 160° C. In even yet another embodiment of the present invention, the cloud point pressure of a solution of polyethylene at about 5 wt % concentration exceeds about 4,550 psig (313.7 barg) at about 160° C.

In one embodiment of the present invention, the cloud point pressure of a solution of polyethylene at about 5 wt % concentration is about 2,300 psig (158.6 barg) at about 180° C. In another embodiment of the present invention, the cloud point pressure of a solution of polyethylene at about 5 wt % concentration is about 1,950 psig (134.4 barg) at about 160° C. In yet another embodiment of the present invention, the cloud point pressure of a solution of polyethylene at about 5 wt % concentration is about 1,650 psig (113.8 barg) at about 140° C. In even yet another embodiment of the present invention, the cloud point pressure of a solution of polyethylene at about 5 wt % concentration is about 1,200 psig (82.7 barg) at about 120° C.

In one embodiment of the present invention, the cloud point pressure of a solution of polyethylene at about 5 wt % concentration is about 4,550 psig (313.7 barg) at about 160° C. In another embodiment of the present invention, the cloud point pressure of a solution of polyethylene at about 5 wt % concentration is about 4,300 psig (296.5 barg) at about 140° C. In yet another embodiment of the present invention, the cloud point pressure of a solution of polyethylene at about 5 wt % concentration is about 4,050 psig (279.2 barg) at about 120° C.

For polyethylene solutions, the cloud point pressure is a monotonically increasing function of temperature in the range between about 120° C. and about 260° C. As it is well known to those skilled in the art, the cloud point pressure is a monotonically increasing function of temperature if for temperature 1 less than temperature 2, then the cloud point pressure (at temperature 1) is less than the cloud point pressure (at temperature 2).

In one embodiment of the present invention, a method for purifying crPE to produce vlPE comprises: a) Obtaining said crPE; wherein said crPE is selected from the group consisting of post-consumer recycled (PCR) polyethylene, post-industrial recycled (PIR) polyethylene, and combinations thereof; and b) Obtaining a solvent; wherein said solvent and said crPE form a one-phase solution at a temperature and at a pressure higher than the cloud point pressure corresponding to said temperature; wherein said cloud point pressure: (i) corresponds to a solution of said crPE in said solvent at about 5 wt % concentration; (ii) is a monotonically increasing function of temperature; (iii) exceeds the following pressure levels: about 700 psig (48.3 barg) at about 120° C., about 1,150 psig (79.3 barg) at about 140° C., about 1,450 psig (100 barg) at about 160° C., and about 1,800 psig (124.1 barg) at about 180° C.; (iv) includes smooth extrapolations at temperatures lower than about 120° C. and higher than about 180° C.; and (v) includes smooth interpolations at temperatures between about 120° C. and about 180° C.

In another embodiment of the present invention, a method for purifying crPE to produce vlPE comprises: a) Obtaining said crPE; wherein said crPE is selected from the group consisting of post-consumer recycled (PCR) polyethylene, post-industrial recycled (PIR) polyethylene, and combinations thereof; and b) Obtaining a solvent; wherein said solvent and said crPE form a one-phase solution at a temperature and at a pressure higher than the cloud point pressure corresponding to said temperature; wherein said cloud point pressure: (i) corresponds to a solution of said crPE in said solvent at about 5 wt % concentration; (ii) is a monotonically increasing function of temperature; (iii) exceeds the following pressure levels: about 2,200 psig (151.7 barg) at about 120° C., about 2,650 psig (182.7 barg) at about 140° C., about 3,000 psig (206.8 barg) at about 160° C., and about 3,300 psig (227.5 barg) at about 180° C.; (iv) includes smooth extrapolations at temperatures lower than about 120° C. and higher than about 180° C.; and (v) includes smooth interpolations at temperatures between about 120° C. and about 180° C.

In yet another embodiment of the present invention, a method for purifying crPE to produce vlPE comprises: a) Obtaining said crPE; wherein said crPE is selected from the group consisting of post-consumer recycled (PCR) polyethylene, post-industrial recycled (PIR) polyethylene, and combinations thereof; and b) Obtaining a solvent; wherein said solvent and said crPE form a one-phase solution at a temperature and at a pressure higher than the cloud point pressure corresponding to said temperature; wherein said cloud point pressure: (i) corresponds to a solution of said crPE in said solvent at about 5 wt % concentration; (ii) is a monotonically increasing function of temperature; (iii) includes the following pressure levels: about 1,200 psig (82.7 barg) at about 120° C., about 1,650 psig (113.8 barg) at about 140° C., about 1,950 psig (134.4 barg) at about 160° C., and about 2,300 psig (158.6 barg) at about 180° C.; (iv) includes smooth extrapolations at temperatures lower than about 120° C. and higher than about 180° C.; and (v) includes smooth interpolations at temperatures between about 120° C. and about 180° C.

In even yet another embodiment of the present invention, a method for purifying crPE to produce vlPE comprises: a) Obtaining said crPE; wherein said crPE is selected from the group consisting of post-consumer recycled (PCR) polyethylene, post-industrial recycled (PIR) polyethylene, and combinations thereof; and b) Obtaining a solvent; wherein said solvent and said crPE form a one-phase solution at a temperature and at a pressure higher than the cloud point pressure corresponding to said temperature; wherein said cloud point pressure: (i) corresponds to a solution of said crPE in said solvent at about 5 wt % concentration; (ii) is a monotonically increasing function of temperature; (iii) includes the following pressure levels: about 4,050 psig (279.2 barg) at about 120° C., about 4,300 psig (296.5 barg) at about 140° C., and about 4,550 psig (313.7 barg) at about 160° C.; (iv) includes smooth extrapolations at temperatures lower than about 120° C. and higher than about 160° C.; and (v) includes smooth interpolations at temperatures between about 120° C. and about 160° C.

The normal boiling points of some solvents are as follows: iso-butane: −11.7° C.; iso-butylene: −6.9° C.; 1-butene: −6.3° C.; n-butane: −1° C.; 2-butene: 0.8-3.7° C.; neo-pentane: 9.5° C.; iso-pentane: 27.8° C.; 1-pentene: 30° C.; n-pentane: 36.1° C.; 2-pentene: 36.3° C.; iso-hexane: 60° C.; 1-hexene: 63.9° C.; n-hexane: 68° C.; and 2-hexene: 69.1° C. In one embodiment of the present invention, the solvent has a normal boiling point less than about 50° C. In another embodiment of the present invention, the solvent has a normal boiling point less than about 40° C. In yet another embodiment of the present invention, the solvent has a normal boiling point less than about 20° C. In even yet another embodiment of the present invention, the solvent has a normal boiling point less than about 0° C.

In one embodiment of the present invention, the solvent comprises n-pentane. In another embodiment of the present invention, the solvent comprises n-butane. In yet another embodiment of the present invention, the solvent is selected from the group consisting of 1-pentene, iso-pentane, neo-pentane, 2-butene, 1-butene, iso-butane, and mixtures thereof.

In one embodiment of the present invention, the solvent is n-pentane. In another embodiment of the present invention, the solvent is n-butane.

In one embodiment of the present invention, said solvent is n-pentane and said crPE is crHDPE. In another embodiment of the present invention, said solvent is n-pentane and said crPE is crLDPE. In yet another embodiment of the present invention, said solvent is n-pentane and said crPE is crLLDPE. In even yet another embodiment of the present invention, said solvent is n-pentane and said crPE is a mixture of crLDPE and crLLDPE.

In one embodiment of the present invention, said solvent is n-butane and said crPE is crHDPE. In another embodiment of the present invention, said solvent in n-butane and said crPE is crLDPE. In yet another embodiment of the present invention, said solvent is n-butane and said crPE is crLLDPE. In even yet another embodiment of the present invention, said solvent is n-butane and said crPE is a mixture of crLDPE and crLLDPE.

In one embodiment of the present invention, said solvent comprises n-pentane and said crPE comprises crHDPE. In another embodiment of the present invention, said solvent comprises n-pentane and said crPE comprises crLDPE. In yet another embodiment of the present invention, said solvent comprises n-pentane and said crPE comprises crLLDPE. In even yet another embodiment of the present invention, said solvent comprises n-pentane and said crPE comprises a mixture of crLDPE and crLLDPE.

In one embodiment of the present invention, said solvent comprises n-butane and said crPE comprises crHDPE. In another embodiment of the present invention, said solvent comprises n-butane and said crPE comprises crLDPE. In yet another embodiment of the present invention, said solvent comprises n-butane and said crPE comprises crLLDPE. In even yet another embodiment of the present invention, said solvent comprises n-butane and said crPE comprises a mixture of crLDPE and crLLDPE.

IV. Extraction Step

In one embodiment of the present invention, a method for purifying crPE to produce vlPE comprises extracting said crPE with a solvent at an extraction mass concentration of at least about 1 wt %, at an extraction temperature, and an extraction pressure; wherein said extraction temperature is from about 120° C. to about 260° C.; wherein said extraction pressure is below the cloud point pressure corresponding to said extraction temperature; and wherein an extracted contaminated reclaimed polyethylene (ecrPE) is produced.

The extraction step takes place in the two-phase regime of the solvent—polyethylene system, i.e., below the cloud point pressure at the specified temperature. As disclosed above, in the two-phase regime, there are the heavy phase (RAF phase) and the light phase (EXTR phase).

Not wishing to be bound by any theory, applicants believe that the extractable contamination migrates from the polyethylene in the heavy phase to the solvent in the light phase due to favorable partition coefficient of the extractable contamination between the solvent and polyethylene in the extracting step. Extractable contamination is part of the contamination of the waste polyethylene and it might include residual processing aids added to polyethylene, residual product formulations which contacted polyethylene (such as, perfumes and flavors), dyes, and any other extractable material that may have been intentionally added or unintentionally became incorporated into polyethylene during waste collection and subsequent accumulation with other waste materials.

Non-limiting examples of liquid-liquid extraction (LLE) equipment that can be used in this extracting step are extraction columns (e.g., static, agitated, or pulsed), mixer-settlers, and centrifugal extractors. Examples of commercial equipment that can be used are Kühni columns, SCHEIBEL® columns, KARR® columns, rotating disc contractor columns, packed columns, sieve columns, etc.

In one embodiment of the present invention, the extracting step takes place in a pressure vessel that may be configured in a way that allows for continuous extraction of the polyethylene with the solvent. In another embodiment of the present invention, the pressure vessel may be a continuous liquid-liquid extraction column where molten polyethylene is pumped into one end of the extraction column and the solvent is pumped into the same (co-current extraction) or the opposite (counter-current extraction) end of the extraction column.

In one embodiment of the present invention, the solvent or the light phase containing the extracted contamination is removed from the process. In another embodiment of the present invention, the solvent containing the extracted contamination is purified, recovered, and recycled for use in the extracting step or a different step in the method. In yet another embodiment of the present invention, the extracting step is performed in a batch mode, wherein the crPE is fixed in a pressure vessel as a polymer phase and the solvent is continuously pumped through the fixed polymer phase. The extracting time or the amount of solvent used will depend on the desired purity of the final purer polyethylene and the amount of extractable contamination in the starting crPE. In even yet another embodiment of the present invention, the solvent containing the extracted contamination is contacted with solid media in a separate step as described in the purification section below.

In one embodiment of the present invention, the extraction mass concentration is at least about 1 wt %. In another embodiment of the present invention, the extraction mass concentration is at least about 2 wt %. In yet another embodiment of the present invention, the extraction mass concentration is at least about 3 wt %. In even yet another embodiment of the present invention, the extraction mass concentration is at least about 5 wt %. In one embodiment of the present invention, the extraction mass concentration is at least about 10 wt %. For the purposes of the present invention, the extraction mass concentration is the concentration of crPE in the two-phase crPE—solvent system (i.e., in both the heavy and light phases) in the extracting step.

In one embodiment of the present invention, the extraction temperature is from about 120° C. to about 260° C. In another embodiment of the present invention, the extraction temperature is from about 140° C. to about 240° C. In yet another embodiment of the present invention, the extraction temperature is from about 160° C. to about 220° C. In even yet another embodiment of the present invention, the extraction temperature is from about 180° C. to about 200° C.

In one embodiment of the present invention, the extraction temperature is about 205° C. In another embodiment of the present invention, the extraction temperature is about 220° C. In yet another embodiment of the present invention, the extraction temperature is about 230° C. In even yet another embodiment of the present invention, the extraction temperature is about 240° C.

In one embodiment of the present invention, the extraction pressure is from about 700 psig (48.3 barg) to about 6,000 psig (413.7 barg). In another embodiment of the present invention, the extraction pressure is from about 1,500 psig (103.4 barg) to about 5,000 psig (344.7 barg). In yet another embodiment of the present invention, the extraction pressure is from about 2,000 psig (137.9 barg) to about 4,000 psig (275.8 barg).

In one embodiment of the present invention, the extraction pressure is about 1,500 psig (103.4 barg). In another embodiment of the present invention, the extraction pressure is about 1,900 psig (131 barg). In yet another embodiment of the present invention, the extraction pressure is about 2,500 psig (172.4 barg). In even yet another embodiment of the present invention, the extraction pressure is about 4,500 psig (310.3 barg).

In one embodiment of the present invention, the solvent is n-pentane, the crPE is crHDPE, the extraction temperature is about 205° C., and the extraction pressure is about 1,900 psig (131 barg). In another embodiment of the present invention, the solvent is n-pentane, the crPE is crHDPE, the extraction temperature is about 230° C., and the extraction pressure is about 1,900 psig (131 barg). In yet another embodiment of the present invention, the solvent is n-pentane, the crPE is crHDPE, the extraction temperature is about 240° C., and the extraction pressure is about 1,900 psig (131 barg). In even yet another embodiment of the present invention, the solvent is n-pentane, the crPE is crHDPE, the extraction temperature is about 260° C., and the extraction pressure is about 1,900 psig (131 barg).

In one embodiment of the present invention, the method for purifying crPE to produce vlPE comprises: a) Obtaining said crPE; wherein said crPE is selected from the group consisting of PCR polyethylene, PIR polyethylene, and combinations thereof; and b) Extracting said crPE with n-pentane at an extraction mass concentration of about 3.5 wt %, at an extraction temperature of about 205° C., and at an extraction pressure of about 1,900 psig (131 barg) to produce an extracted contaminated reclaimed polyethylene (ecrPE).

In one embodiment of the present invention, the solvent is n-butane, the crPE is crHDPE, the extraction temperature is about 200° C., and the extraction pressure is about 4,500 psig (310.3 barg). In another embodiment of the present invention, the solvent is n-butane, the crPE is crHDPE, the extraction temperature is about 240° C., and the extraction pressure is about 4,500 psig (310.3 barg). In yet another embodiment of the present invention, the solvent is n-butane, the crPE is crHDPE, the extraction temperature is about 260° C., and the extraction pressure is about 4,500 psig (310.3 barg).

V. Dissolution Step

In one embodiment of the present invention, a method for purifying crPE to produce vlPE comprises: a) Obtaining said crPE; wherein said crPE is selected from the group consisting of post-consumer recycled (PCR) polyethylene, post-industrial recycled (PIR) polyethylene, and combinations thereof; b) Obtaining a solvent; wherein said solvent and said crPE form a one-phase solution at a temperature and at a pressure higher than the cloud point pressure corresponding to said temperature; wherein said cloud point pressure: (i) corresponds to a solution of said crPE in said solvent at about 5 wt % concentration; (ii) is a monotonically increasing function of temperature; (iii) includes the following pressure levels: about 1,200 psig (82.7 barg) at about 120° C., about 1,650 psig (113.8 barg) at about 140° C., about 1,950 psig (134.4 barg) at about 160° C., and about 2,300 psig (158.6 barg) at 180° C.; (iv) includes smooth extrapolations at temperatures lower than about 120° C. and higher than about 180° C.; and (v) includes smooth interpolations at temperatures between about 120° C. and about 180° C.; c) Extracting said crPE with said solvent at an extraction mass concentration of at least about 1 wt %, at an extraction temperature, and at an extraction pressure; wherein, said extraction temperature is from about 110° C. to about 260° C.; wherein said extraction pressure is below the cloud point pressure corresponding to said extraction temperature; and wherein an extracted contaminated reclaimed polyethylene (ecrPE) is produced; and d) Dissolving the ecrPE in said solvent at a dissolution mass concentration of at least about 1 wt %, at a dissolution temperature, and at a dissolution pressure; wherein said dissolution temperature is from about 120° C. to about 260° C.; wherein said dissolution pressure is above the cloud point pressure corresponding to said temperature; and wherein a first suspension comprising dissolved polyethylene (PE) and suspended particulate contaminants is produced.

In another embodiment of the present invention, a method for purifying crPE to produce vlPE comprises: a) Obtaining said crPE; wherein said crPE is selected from the group consisting of post-consumer recycled (PCR) polyethylene, post-industrial recycled (PIR) polyethylene, and combinations thereof; b) Extracting said crPE with n-pentane at an extraction mass concentration of about 3.5 wt %, at an extraction temperature of about 205° C., and at an extraction pressure of about 1,900 psig (131 barg) to produce an extracted contaminated reclaimed polyethylene (ecrPE); and c) Dissolving the ecrPE in n-pentane at a dissolution mass concentration of about 3.5 wt %, at a dissolution temperature of about 140° C., and a dissolution pressure of about 1,900 psig (131 barg) to produce a first suspension comprising dissolved polyethylene (PE) and suspended particulate contaminants. In yet another embodiment of the present invention, the solvent is n-pentane, the crPE is crHDPE, the extraction temperature is about 205° C. and the extraction pressure is about 1,900 psig (131 barg), and the dissolution temperature is about 140° C. and the dissolution pressure is about 1,900 psig (131 barg).

In the dissolution step, the ecrPE is brought into the one-phase regime of the polyethylene-solvent system by changing the pressure and/or temperature so that the dissolution pressure is higher than the cloud point pressure corresponding to the dissolution temperature. The dissolution is aided with mixing at the dissolution temperature and pressure, that can be achieved in typical equipment, such as mixing columns and vessels, static systems, etc. Furthermore, the dissolution temperature and pressure can be controlled in such a way to enable dissolution of polyethylene while not dissolving other polymers or polymer mixtures. This controllable dissolution enables the separation of polyethylene from polymer mixtures. Once the polyethylene is dissolved into the solvent in this dissolution step, the particulate contaminants (e.g. pigments, fillers, dirt, etc.), which are part of the crPE, will be released from the polyethylene and be suspended, thus forming a first suspension.

In one embodiment of the present invention, a method for purifying crPE to produce vlPE comprises: a) Extracting the crPE in a solvent at an extraction temperature and at an extraction pressure to produce an extracted crPE (ecrPE); and b) Dissolving the ecrPE in said solvent at a dissolution temperature and at a dissolution pressure. In another embodiment of the present invention, a method for purifying crPE to produce vlPE comprises: a) Extracting the crPE in n-pentane at an extraction temperature and at an extraction pressure to produce an extracted crPE (ecrPE); and b) Dissolving the ecrPE in n-pentane at a dissolution temperature and at a dissolution pressure. In yet another embodiment of the present invention, a method for purifying crPE to produce vlPE comprises: a) Extracting the crPE in n-pentane at an extraction temperature from about 120° C. and about 260° C., and at an extraction pressure below the cloud point pressure corresponding to said extraction temperature to produce an extracted crPE (ecrPE); and b) Dissolving the ecrPE in n-pentane at a dissolution temperature from about 120° C. and about 260° C., and at a dissolution pressure above the cloud point pressure corresponding to said dissolution temperature. In even yet another embodiment of the present invention, a method for purifying crPE to produce vlPE comprises: a) Extracting the crPE in n-pentane at an extraction temperature from about 140° C. and about 240° C., and at an extraction pressure below the cloud point pressure corresponding to said extraction temperature to produce an extracted crPE (ecrPE); and b) Dissolving the ecrPE in n-pentane at a dissolution temperature from about 120° C. to about 160° C., and at a dissolution pressure above the cloud point pressure corresponding to said dissolution temperature.

In one embodiment of the present invention, the dissolution temperature is from about 120° C. to about 260° C. In another embodiment of the present invention, the dissolution temperature is from about 140° C. to about 240° C. In yet another embodiment of the present invention, the dissolution temperature is from about 160° C. to about 220° C. In even yet another embodiment of the present invention, the dissolution temperature is from about 180° C. to about 200° C.

In one embodiment of the present invention, the dissolution temperature is about 120° C. In another embodiment of the present invention, the dissolution temperature is about 140° C. In yet another embodiment of the present invention, the dissolution temperature is about 160° C. In even yet another embodiment of the present invention, the dissolution temperature is about 180° C.

In one embodiment of the present invention, the dissolution pressure is from about 700 psig (48.3 barg) to about 6,000 psig (413.7 barg). In another embodiment of the present invention, the dissolution pressure is from about 1,500 psig (103.4 barg) to about 5,000 psig (344.7 barg). In yet another embodiment of the present invention, the dissolution pressure is from about 2,000 psig (137.9 barg) to about 4,000 psig (275.8 barg).

In one embodiment of the present invention, the dissolution pressure is about 1,500 psig (103.4 barg). In another embodiment of the present invention, the dissolution pressure is about 1,900 psig (131 barg). In yet another embodiment of the present invention, the dissolution pressure is about 2,500 psig (172.4 barg). In even yet another embodiment of the present invention, the dissolution pressure is about 4,500 psig (310.3 barg).

In one embodiment of the present invention, the dissolution mass concentration is at least about 1 wt %. In another embodiment of the present invention, the dissolution mass concentration is at least about 2 wt %. In yet another embodiment of the present invention, the dissolution mass concentration is at least about 3 wt %. In even yet another embodiment of the present invention, the dissolution mass concentration is at least about 5 wt %. In one embodiment of the present invention, the dissolution mass concentration is at least about 10 wt %.

In one embodiment of the present invention, the dissolution solvent is the same as the extraction solvent. In another embodiment of the present invention, the dissolution solvent is different than the extraction solvent. In one embodiment of the present invention, the dissolution solvent is n-butane, and the extraction solvent is n-pentane.

After the dissolution is achieved and the first suspension is formed, the suspended contaminants are settled (in the settling operation) by experiencing a force that uniformly moves them in the direction of the force. Typically, the applied settling force is gravity, but can also be a centrifugal, centripetal, or other force. The amount of applied force and duration of the settling operation (settling time) will depend upon several parameters, including, but not limited to, particle size of the contaminant particles, contaminant particle density, density of the solution, and viscosity of the solution. Some of the key parameters that determine the solution viscosity are the chemical composition of the solvent, the molecular weight and concentration of the polyethylene dissolved in the solvent, and the temperature and pressure of the solution. At the end of the settling operation, a layer of settled particulate contaminants and a second suspension are produced. The second suspension includes the suspended remaining particulate contaminants, that have not been settled in the settled layer. Typically, the larger contaminant particles are settled, and the smaller contaminant particles are suspended in the second suspension. Typically, the temperature, pressure, and concentration conditions of the settling operation are the same as those of the dissolution step. Processing aids to help the settling operation, such as flocculation aids, can also be added in the first suspension or in the contaminated reclaimed PE or at any point in this method.

In one embodiment of the present invention, a method for purifying crPE to produce vlPE comprises settling said first suspension at a settling temperature and at a settling pressure; said settling temperature is from about 120° C. to about 260° C.; said settling pressure is above the cloud point pressure corresponding to said settling temperature; and a second suspension comprising dissolved PE and suspended remaining particulate contaminants is produced. In another embodiment of the present invention, a method for purifying crPE to produce vlPE comprises settling said first suspension at a settling temperature and at a settling pressure; said settling temperature is from about 140° C. to about 240° C.; said settling pressure is above the cloud point pressure corresponding to said settling temperature; and a second suspension comprising dissolved PE and suspended remaining particulate contaminants is produced. In yet another embodiment of the present invention, a method for purifying crPE to produce vlPE comprises settling said first suspension at a settling temperature and at a settling pressure; said settling temperature is from about 160° C. to about 220° C.; said settling pressure is above the cloud point pressure corresponding to said settling temperature; and a second suspension comprising dissolved PE and suspended remaining particulate contaminants is produced. In even yet another embodiment of the present invention, a method for purifying crPE to produce vlPE comprises settling said first suspension at a settling temperature and at a settling pressure; said settling temperature is from about 180° C. to about 200° C.; said settling pressure is above the cloud point pressure corresponding to said settling temperature; and a second suspension comprising dissolved PE and suspended remaining particulate contaminants is produced.

In one embodiment of the present invention, a method for purifying crPE to produce vlPE comprises settling said first suspension at about 140° C. and about 1,900 psig (131 barg) to produce a second suspension comprising dissolved PE and suspended remaining particulate contaminants. In another embodiment of the present invention, the solvent is n-pentane, the crPE is crHDPE, the extraction temperature is about 205° C. and the extraction pressure is about 1,900 psig (131 barg), the dissolution temperature is about 140° C. and the dissolution pressure is about 1,900 psig (131 barg), and the settling temperature is about 140° C. and the settling pressure is about 1,900 psig (131 barg).

The purification of said second suspension proceeds by contacting said second suspension with solid media. For the purposes of the present invention, the solid media are any solid materials that remove at least some of the contamination (particulate or not) from the second suspension. Although not wishing to be bound by any theory, applicants believe that the solid media remove the contamination by a variety of mechanisms. Non-limiting examples of possible mechanisms include adsorption, absorption, size exclusion, ion exclusion, ion exchange, and other mechanisms that are well known to those having ordinary skill in the art. Furthermore, the pigments and other contaminants commonly found in crPE may be polar compounds and may preferentially interact with the solid media, which may also be at least slightly polar. The polar-polar interactions are especially favorable when a non-polar solvent, such as alkane, is used as the solvent.

In one embodiment of the present invention, the solid media are selected from the group consisting of inorganic material, carbon-based material, and mixtures thereof. Non-limiting examples of inorganic materials are silica (silicon oxide), alumina (aluminum oxide), activated alumina (activated aluminum oxide), iron oxide, aluminum silicate, magnesium silicate, amorphous volcanic glass, reclaimed glass, silica gel, diatomaceous earth, sand, quartz, perlite, fuller's earth, bentonite, and mixtures thereof. In another embodiment of the present invention, the inorganic material is selected from the group consisting of silica, alumina, iron oxide, aluminum silicate, amorphous volcanic glass, and mixtures thereof. In yet another embodiment of the present invention, the inorganic material comprises diatomaceous earth. In even yet another embodiment of the present invention, the inorganic material comprises activated alumina. In one embodiment of the present invention, the inorganic material comprises reclaimed glass.

Non-limiting examples of carbon-based materials are anthracite coal, carbon black, coke, activated carbon, cellulose, and mixtures thereof. In one embodiment of the present invention, the carbon-based material is selected from the group consisting of anthracite coal, carbon black, coke, activated carbon, cellulose, and mixtures thereof. In another embodiment of the present invention, the carbon-based material comprises activated carbon.

In one embodiment of the present invention, the solid media are contacted with the second suspension in a mixing vessel for a specified amount of time while the contents of the vessel are mixed. In another embodiment of the present invention, the solid media are removed from the mixing vessel via a solid-liquid separation step. Non-limiting examples of solid-liquid separation steps include filtration, decantation, centrifugation, and settling.

In one embodiment of the present invention, the second suspension is passed through a stationary bed of solid media. In another embodiment of the present invention, the solid media are placed in an axial flow filter. In yet another embodiment of the present invention, the solid media are placed in a radial flow filter. A non-limiting example of a radial flow filter is a candle filter. In even yet another embodiment of the present invention, the solid media are placed in a candle filter.

In one embodiment of the present invention, the height or length of the stationary bed of solid media is greater than 5 cm. In another embodiment of the present invention, the height or length of the stationary bed of solid media is greater than 10 cm. In yet another embodiment of the present invention, the height or length of the stationary bed of solid media is greater than 20 cm. In even yet another embodiment of the present invention, the solid media are replaced as needed to maintain a desired purity of polyethylene. In one embodiment, the solid media are regenerated and reused in the purification step. In another embodiment, the solid media are regenerated by fluidizing the solid media during a backwashing step.

In one embodiment of the present invention, the purification comprises contacting the second suspension with the solid media in a candle filter followed by an axial flow filter, and the solid media of the candle filter comprise diatomaceous earth and the solid media of the axial flow filter comprise activated alumina.

In one embodiment of the present invention, a method for purifying crPE to produce vlPE comprises: a) Obtaining said crPE; wherein said crPE is selected from the group consisting of post-consumer recycled (PCR) polyethylene, post-industrial recycled (PIR) polyethylene, and combinations thereof; b) Obtaining a solvent; wherein said solvent and said crPE form a one-phase solution at a temperature and at a pressure higher than the cloud point pressure corresponding to said temperature; wherein said cloud point pressure: (i) corresponds to a solution of said crPE in said solvent at about 5 wt % concentration; (ii) is a monotonically increasing function of temperature; (iii) includes the following pressure levels: about 1,200 psig (82.7 barg) at about 120° C., about 1,650 psig (113.8 barg) at about 140° C., about 1,950 psig (134.4 barg) at about 160° C., and about 2,300 psig (158.6 barg) at about 180° C.; (iv) includes smooth extrapolations at temperatures lower than about 120° C. and higher than about 180° C.; and (v) includes smooth interpolations at temperatures between about 120° C. and about 180° C.; c) Extracting said crPE with said solvent at an extraction mass concentration of at least about 1 wt %, at an extraction temperature, and an extraction pressure; wherein said extraction temperature is from about 120° C. to about 260° C.; wherein said extraction pressure is below the cloud point pressure corresponding to said extraction temperature; and wherein an extracted contaminated reclaimed polyethylene (ecrPE) is produced; d) Dissolving the ecrPE in said solvent at a dissolution mass concentration of at least about 1 wt %, at a dissolution temperature, and at a dissolution pressure; wherein said dissolution temperature is from about 120° C. to about 260° C.; wherein said dissolution pressure is above the cloud point pressure corresponding to said dissolution temperature; and wherein a first suspension comprising dissolved polyethylene (PE) and suspended particulate contaminants is produced; c) Settling said first suspension at a settling temperature and at a settling pressure; wherein said settling temperature is from about 120° C. to about 260° C.; wherein said settling pressure is above the cloud point pressure corresponding to said settling temperature; and wherein a second suspension comprising dissolved PE and suspended remaining particulate contaminants is produced; and f) Purifying said second suspension at a purification temperature and at a purification pressure by contacting said second suspension with solid media; wherein said purification temperature is from about 120° C. to about 260° C.; wherein said purification pressure is above the cloud point pressure corresponding to said purification temperature; and wherein a third suspension comprising purer PE is produced.

In another embodiment of the present invention, a method for purifying crPE to produce vlPE comprises: a) Obtaining said crPE; wherein said crPE is selected from the group consisting of post-consumer recycled (PCR) polyethylene, post-industrial recycled (PIR) polyethylene, and combinations thereof; b) Extracting said crPE with n-pentane at an extraction mass concentration of about 3.5 wt %, at an extraction temperature of about 205° C., and at an extraction pressure of about 1,900 psig (131 barg) to produce an extracted contaminated reclaimed polyethylene (ecrPE); c) Dissolving the ecrPE in n-pentane at a mass concentration of about 3.5 wt %, at a dissolution temperature of about 140° C., and at a dissolution pressure of about 1,900 psig (131 barg) to produce a first suspension comprising dissolved polyethylene (PE) and suspended particulate contaminants; e) Settling said first suspension at about 140° C. and at about 1,900 psig (131 barg) to produce a second suspension comprising dissolved PE and suspended remaining particulate contaminants; and f) Purifying said second suspension by contacting said second suspension with solid media at about 140° C. and at about 1,900 psig (131 barg) to produce a third suspension comprising purer PE; wherein said purification comprises contacting said second suspension with said solid media in a candle filter followed by an axial flow filter; and wherein said solid media of said candle filter comprise diatomaceous earth and said solid media of said axial flow filter comprise activated alumina.

In yet another embodiment of the present invention, the solvent is n-pentane; the crPE is crHDPE; the extraction temperature is about 205° C. and the extraction pressure is about 1,900 psig (131 barg); the dissolution temperature is about 140° C. and the dissolution pressure is about 1,900 psig (131 barg); the settling temperature is about 140° C. and the settling pressure is about 1,900 psig (131 barg); and the purification temperature is about 140° C. and the purification pressure is about 1,900 psig (131 barg).

Typically, the type of solvent and polyethylene mass concentration in the purification step, and purification temperature and pressure are the same as those in the dissolution step and/or those in the extraction step.

In one embodiment of the present invention, the purification mass concentration is at least about 1 wt %. In another embodiment of the present invention, the purification mass concentration is at least about 2 wt %. In yet another embodiment of the present invention, the purification mass concentration is at least about 3 wt %. In even yet another embodiment of the present invention, the purification mass concentration is at least about 5 wt %. In one embodiment of the present invention, the purification mass concentration is at least about 10 wt %.

In one embodiment of the present invention, a method for purifying crPE to produce vlPE comprises separating the purer PE from the third suspension. In another embodiment of the present invention, the separation of the purer PE from the third suspension takes place at a separation temperature and at a separation pressure; and wherein the PE precipitates from solution and is no longer dissolved in the solvent. In yet another embodiment of the present invention, the separation of the purer PE from the solvent is accomplished by reducing the separation pressure at a fixed separation temperature. In even yet another embodiment of the present invention, the separation of the purer PE from the solvent is accomplished by reducing the separation temperature at a fixed separation pressure. In one embodiment of the present invention, the separation of the purer PE from the solvent is accomplished by increasing the separation temperature at a fixed separation pressure. In another embodiment, the separation of the purer PE from the solvent is accomplished by reducing both the separation temperature and separation pressure.

The solvent can be partially or completely converted from the liquid to the vapor phase by controlling the separation temperature and separation pressure. In one embodiment of the present invention, the separation of the purer PE from the solvent is accomplished without completely converting the solvent into a 100% vapor by controlling the separation temperature and separation pressure of the solvent during the separation step.

The separation of the purer PE from the solvent can be accomplished by any method of liquid-liquid or liquid-solid separation. Non-limiting examples of liquid-liquid or liquid-solid separations include filtration, decantation, centrifugation, and settling.

VI Purer PE

In one embodiment of the present invention, the purer PE, which may be sourced from PCR PE, is essentially contaminant-free, pigment-free, odor-free, homogenous, and similar in properties to virgin PE (vPE). In another embodiment of the present invention, the physical properties of the solvent may enable more energy efficient methods for separation of the solvent from the purer PE.

In one embodiment of the present invention, the purer PE has virgin-like optical properties (vlPE). In another embodiment of the present invention, the purer PE has virgin-like optical properties (vlPE); and the vlPE has L* greater than about 82, a* greater than about −3, b* less than about 5, and Y less than about 40%.

In one embodiment of the present invention, a method for purifying crPE to produce vlPE comprises: a) Obtaining said crPE; wherein said crPE is selected from the group consisting of post-consumer recycled (PCR) polyethylene, post-industrial recycled (PIR) polyethylene, and combinations thereof; b) Obtaining a solvent; wherein said solvent and said crPE form a one-phase solution at a temperature and at a pressure higher than the cloud point pressure corresponding to said temperature; wherein said cloud point pressure: (i) corresponds to a solution of said crPE in said solvent at about 5 wt % concentration; (ii) is a monotonically increasing function of temperature; (iii) includes the following pressure levels: about 1,200 psig (82.7 barg) at about 120° C., about 1,650 psig (113.8 barg) at about 140° C., about 1,950 psig (134.4 barg) at about 160° C., and about 2,300 psig (158.6 barg) at about 180° C.; (iv) includes smooth extrapolations at temperatures lower than about 120° C. and higher than about 180° C.; and (v) includes smooth interpolations at temperatures between about 120° C. and about 180° C.; c) Extracting said crPE with said solvent at an extraction mass concentration of at least about 1 wt %, at an extraction temperature, and an extraction pressure; wherein said extraction temperature is from about 120° C. to about 260° C.; wherein said extraction pressure is below the cloud point pressure corresponding to said extraction temperature; and wherein an extracted contaminated reclaimed polyethylene (ecrPE) is produced; d) Dissolving the ecrPE in said solvent at a dissolution mass concentration of at least about 1 wt %, at a dissolution temperature, and at a dissolution pressure; wherein said dissolution temperature is from about 120° C. to about 260° C.; wherein said dissolution pressure is above the cloud point pressure corresponding to said dissolution temperature; and wherein a first suspension comprising dissolved polyethylene (PE) and suspended particulate contaminants is produced; c) Settling said first suspension at a settling temperature and at a settling pressure; wherein said settling temperature is from about 120° C. to about 260° C.; wherein said settling pressure is above the cloud point pressure corresponding to said settling temperature; and wherein a second suspension comprising dissolved PE and suspended remaining particulate contaminants is produced; f) Purifying said second suspension at a purification temperature and at a purification pressure by contacting said second suspension with solid media; wherein said purification temperature is from about 120° C. to about 260° C.; wherein said purification pressure is above the cloud point pressure corresponding to said purification temperature; and wherein a third suspension comprising purer PE is produced; and g) Separating said purer PE from said third suspension; and wherein said purer PE is said vlPE.

In another embodiment of the present invention, a method for purifying crPE to produce vlPE comprises: a) Obtaining said crPE; wherein said crPE is selected from the group consisting of post-consumer recycled (PCR) polyethylene, post-industrial recycled (PIR) polyethylene, and combinations thereof; b) Extracting said crPE with n-pentane at an extraction mass concentration of about 3.5 wt %, at an extraction temperature of about 205° C., and at an extraction pressure of about 1,900 psig (131 barg) to produce an extracted contaminated reclaimed polyethylene (ecrPE); c) Dissolving the ecrPE in n-pentane at a mass concentration of about 3.5 wt %, at a dissolution temperature of about 140° C., and at a dissolution pressure of about 1,900 psig (131 barg) to produce a first suspension comprising dissolved polyethylene (PE) and suspended particulate contaminants; d) Settling said first suspension at about 140° C. and at about 1,900 psig (131 barg) to produce a second suspension comprising dissolved PE and suspended remaining particulate contaminants; e) Purifying said second suspension by contacting said second suspension with solid media at about 140° C. and at about 1,900 psig (131 barg) to produce a third suspension comprising purer PE; wherein said purification comprises contacting said second suspension with said solid media in a candle filter followed by an axial flow filter; and wherein said solid media of said candle filter comprise diatomaceous earth and said solid media of said axial flow filter comprise activated alumina; and f) Separating said purer PE from said third suspension; wherein said purer PE is said vlPE; and wherein said vlPE has L* greater than about 82, a* greater than about −3, b* less than about 5, and Y less than about 40%.

In yet another embodiment of the present invention, the solvent is n-pentane; the crPE is crHDPE; the extraction temperature is about 205° C. and the extraction pressure is about 1,900 psig (131 barg); the dissolution temperature is about 140° C. and the dissolution pressure is about 1,900 psig (131 barg); the settling temperature is about 140° C. and the settling pressure is about 1,900 psig (131 barg); the purification temperature is about 140° C. and the purification pressure is about 1,900 psig (131 barg); and the vlPE has L* greater than about 82, a* greater than about −3, b* less than about 5, and Y less than about 40%.

In one embodiment of the present invention, a method for purifying crPE to produce vlPE comprises de-inking of said crPE. A non-limiting example of a de-inking process is described in U.S. Pat. No. 9,616,595, which discloses an ink removal step with the use of an aqueous cleaning fluid with high pH and selective cleaning agents, such as dodecyl sulfate, and high turbulence.

VII Examples

Example 1—Comparative

Figure 2:
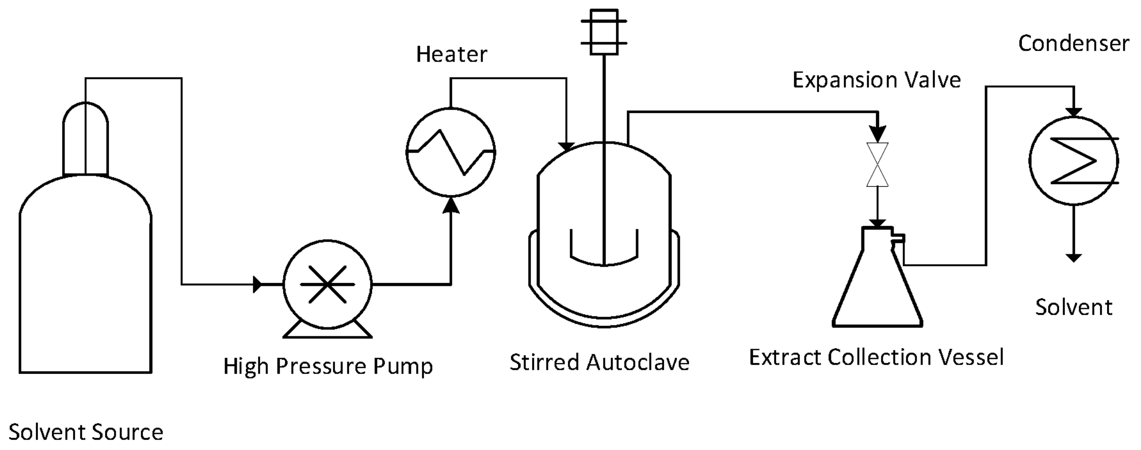
FIG. 2 is a block flow diagram showing the major components of the extraction step of the method of the present invention.
Figure 3:
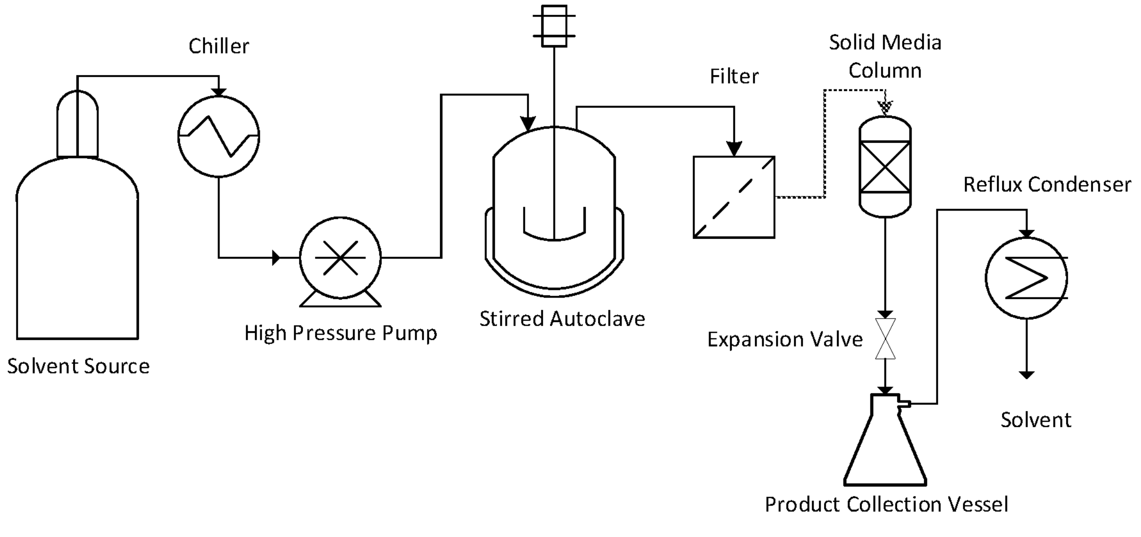
FIG. 3 is a block flow diagram showing the major components of the dissolution step of the method of the present invention.

A sample of post-consumer recycled HDPE "mixed color" flake (also called HDPE Jazz Flake or HDPE JF; used to produce the TPS-8000 product; TABB Packaging Solutions, LLC; Canton, MI) was processed using the experimental apparatuses shown in FIGS. 2 and 3 and the following procedure (at Phasex Corporation, 125 Flagship Drive, North Andover, MA). 75 g of HDPE JF were loaded into a 7.695 L (working volume) autoclave (Model 4552M; Parr Instrument Company; Moline, IL) equipped with an overhead mechanical stirrer. The air from the autoclave headspace was removed with 3 repeat cycles of vacuuming and $N_2$ purging. The autoclave was then filled with 3,472 g of hexanes (Catalog #: 35900ACS; >98.5% Hexane isomers and methyl cyclopentane; Pharmco by Greenfield Global, Inc.; Brookfield, CT) and its contents were equilibrated at an internal temperature of about 230° C. and pressure of about 600 psig (41.4 barg), i.e., extraction conditions. At those extraction conditions the material in the autoclave is in a two-phase regime, i.e., one phase with hexanes and a small amount of low-molecular-weight HDPE JF dissolved (light or extract phase) and the other phase with a large amount of HDPE JF dissolved in hexanes (heavy or raffinate phase). The autoclave material was then extracted 5 times using the experimental configuration of FIG. 2 and the following procedure: the autoclave material was stirred for about 10 min at about 680 rpms, then it was allowed to settle for about 10 min, and finally one vessel volume of hexanes was flushed through the autoclave into the extract collection flask through an expansion valve. The above extraction procedure was repeated four more times. The material collected from all 5 extraction cycles was labeled "PE-27 Fraction 1". The remaining autoclave material was then dissolved in hexanes at the dissolution conditions of about 210° C. and about 1900 psig (131 barg), thus creating a one-phase system. The dissolved material was purified and collected using the experimental configuration of FIG. 3 and the following procedure: the autoclave material was stirred for about 60 min at about 680 rpms, then it was allowed to settle for about 60 min, then the autoclave material was removed from the autoclave by opening the autoclave valve and allowing it to pass through a candle filter, an activated alumina column, an expansion valve, and get collected into the product collection flask. The candle filter (FUNDABAC® Filter High pressure TSD with filter volume about 1 L; Dr Mueller AG, Maennedorf, Switzerland) had a stainless-steel sock/hose (about 5.5 in. (14 cm) long) coated with about 18 g of diatomaceous earth (Celatom® FW-40; EP Minerals, LLC; Reno, NV). The activated alumina column had about 0.68 in. (1.73 cm) ID and about 30 in. (76.2 cm) length, and it was charged with about 120 g of spherical activated alumina particles 1/16 in. (1.59 mm), 7×14 mesh (1.41 mm-2.83 mm; Catalog #: 87014; Sorbent Technologies, Inc.; Norcross, GA). The product fractions were labelled sequentially starting with "PE-27 Fraction 2". Fractions were collected until". Fractions were collected until a low solubility was noticed/calculated. After all samples were collected, the autoclave was equilibrated to atmospheric pressure and room temperature. All residual material in the autoclave was then collected as a residuum sample.

The PE-27 Fraction 2, PE-27 Fraction 3, and PE-27 Fraction 4 were compression molded into 1-mm thick and 30×30 mm windows (following the principles of ASTM D4703-16 "Standard Practice for Compression Molding Thermoplastic Materials into Test Specimens, Plaques, or Sheets"). The temperature used for the compression molding was about 160° C., the pressure was about 1.8 metric tons, and Teflon sheets were used as release liners. The optical properties of these windows were then measured (following the principles of ASTM E308 "Standard Practice for Computing the Colors of Objects by Using the CIE System") using the LabScan XE (Hunter Associates Laboratory, Inc.; Reston, VA) and D65/10 conditions, i.e., D65 light source and 10-degree observer angle. The results were: L*=77.4±1.4; a*=−5.3±1.5; b*=10.7±2.2; and Y (opacity)=78.2%±14.1%.

For comparison, a typical blow-molding virgin HDPE (Formolene® HB5502F; Formosa Plastics Corp.; Livingston, NJ) has the following optical values: L*=85.9±0.1; a*=−1.3±0.0; b*=−0.3±0.0; and Y (opacity)=41.3%±0.6%. Also, a typical film grade virgin low-density PE (LDPE) (Dow™ 640i; Dow Chemical Company, Midland, MI) has the following optical values: L*=83.7±0.2; a*=−0.5±0.0; b*=1.3±0.1; and Y (opacity)=17.8%±1.5%. Finally, a typical film grade virgin linear low-density PE (LLDPE) (Dowlex™ 2045G; Dow Chemical Company; Midland, MI) has the following optical values: L*=82.6±1.2; a*=−1.0±0.1; b*=2.1±0.2; and Y (opacity)=15.4%±1.9%. The relatively low value of b* for the virgin HDPE resin vs. that for the LDPE and LLDPE resins is due to specific additives used for HDPE.

For comparison, the HDPE JF, which was fed into EXAMPLE 1, in pellet form, had the following optical properties: L*=64.6±3.6; a*=16±13; b*=16.8±6.4; and Y (opacity)=100%. A natural recycled HDPE material (KWR101-150; KW Plastics, Inc.; Troy, AL) had the following optical properties: L*=77.2±0.7; a*=−0.8±0.3; b*=5.7±0.2; and Y (opacity)=57.2%±1.6%.

Example 2

The feed of EXAMPLE 1 was processed the same way as in EXAMPLE 1; however, the solvent was n-pentane (3,200 g were charged in the autoclave at the beginning of the experiment; and the cloud point curve of the HDPE solution in n-pentane at about 5 wt % concentration is shown in FIG. 1), extraction conditions were 205° C. and 1900 psig (131 barg), and dissolution conditions were 140° C. and 1900 psig (131 barg). The product fractions were labelled sequentially starting with "PE-30 Fraction 2". The optical properties of the product fractions were: L*=83.8±0.6; a*=−2.4±0.3; b*=3.5±0.4; and Y (opacity)=34.0%±4.7%.

The results from EXAMPLES 1 and 2, virgin polyethylene samples, HDPE JF, and natural recycled HDPE are summarized in TABLE 1 below.

TABLE 1

| EXAMPLE # | L*, [—] | a*, [—] | b*, [—] | Y, [%] |
|---|---|---|---|---|
| Virgin HDPE (HB5502F) | 85.9 ± 0.1 | −1.3 ± 0.0 | −0.3 ± 0.0 | 41.3 ± 0.6 |
| HDPE Jazz Flake TPS-8000 | 64.6 ± 3.6 | 16.0 ± 12.8 | 16.8 ± 6.4 | 100 |
| KWR101-150 Natural rHDPE | 77.2 ± 0.7 | −0.8 ± 0.3 | 5.7 ± 0.2 | 57.2 ± 1.6 |
| Virgin LDPE (640i) | 83.7 ± 0.2 | −0.5 ± 0.0 | 1.3 ± 0.1 | 17.8 ± 1.5 |
| Virgin LLDPE (2045G) | 82.6 ± 1.2 | −1.0 ± 0.1 | 2.1 ± 0.2 | 15.4 ± 1.9 |
| 1 (comparative) | 77.4 ± 1.4 | −5.3 ± 1.5 | 10.7 ± 2.2 | 78.2 ± 14.1 |
| 2 (inventive) | 83.8 ± 0.6 | −2.4 ± 0.3 | 3.5 ± 0.4 | 34.0 ± 4.7 |

The foregoing description is given for clearness of understanding only, and no unnecessary limitations should be understood therefrom, as modifications within the scope of the invention may be apparent to those having ordinary skill in the art.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, comprising any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for purifying contaminated reclaimed polyethylene (crPE) to produce recycled polyethylene with virgin-like optical properties (vlPE) comprising:

a. Obtaining said crPE; wherein said crPE is selected from the group consisting of post-consumer recycled (PCR)

polyethylene, post-industrial recycled (PIR) polyethylene, and combinations thereof, b. Obtaining a solvent; wherein said solvent and said crPE form a one-phase solution at a temperature and at a pressure higher than the cloud point pressure corresponding to said temperature; wherein said cloud point pressure:
   i. corresponds to a solution of said crPE in said solvent at about 5 wt % concentration;
   ii. is a monotonically increasing function of temperature;
   iii. exceeds the following pressure levels: about 700 psig (48.3 barg) at about 120° C., about 1,150 psig (79.3 barg) at about 140° C., about 1,450 psig (100 barg) at about 160° C., and about 1,800 psig (124.1 barg) at about 180° C.;
   iv. includes smooth extrapolations at temperatures lower than about 120° C. and higher than about 180° C.; and
   v. includes smooth interpolations at temperatures between about 120° C. and about 180° C.;

c. Extracting said crPE with said solvent at an extraction mass concentration of at least about 1 wt %, at an extraction temperature, and an extraction pressure; wherein said extraction temperature is from about 120° C. to about 260° C.; wherein said extraction pressure is below the cloud point pressure corresponding to said extraction temperature; and wherein an extracted contaminated reclaimed polyethylene (ecrPE) is produced;

d. Dissolving the ecrPE in said solvent at a dissolution mass concentration of at least about 1 wt %, at a dissolution temperature, and at a dissolution pressure; wherein said dissolution temperature is from about 120° C. to about 260° C.; wherein said dissolution pressure is above the cloud point pressure corresponding to said dissolution temperature; and wherein a first suspension comprising dissolved polyethylene (PE) and suspended particulate contaminants is produced;

e. Settling said first suspension at a settling temperature and at a settling pressure;

wherein said settling temperature is from about 120° C. to about 260° C.; wherein said settling pressure is above the cloud point pressure corresponding to said settling temperature; and wherein a second suspension comprising dissolved PE and suspended remaining particulate contaminants is produced;

f. Purifying said second suspension at a purification temperature and at a purification pressure by contacting said second suspension with solid media; wherein said purification temperature is from about 120° C. to about 260° C.; wherein said purification pressure is above the cloud point pressure corresponding to said purification temperature; and wherein a third suspension comprising purer PE is produced; and g. Separating said purer PE from said third suspension; and wherein said purer PE is said vlPE;

wherein step d comprises the use of processing aids.

2. The method of claim 1, wherein said cloud point pressure is about 1,200 psig (82.7 barg) at about 120° C., about 1,650 psig (113.8 barg) at about 140° C., about 1,950 psig (134.4 barg) at about 160° C., and about 2,300 psig (158.6 barg) at about 180° C.

3. The method of claim 1, wherein said solvent is n-butane.

4. The method of claim 1, wherein said solvent is n-pentane.

5. The method of claim 1, wherein said crPE comprises contaminated reclaimed high-density polyethylene (crHDPE).

6. The method of claim 1, wherein said crPE comprises contaminated reclaimed low-density polyethylene (crLDPE).

7. The method of claim 1, wherein said crPE comprises contaminated reclaimed linear low-density polyethylene (crLLDPE).

8. The method of claim 1, wherein said crPE comprises a mixture of crLDPE and crLLDPE.

9. The method of claim 1, wherein said solvent is n-pentane; and wherein said crPE is crHDPE.

10. The method of claim 1, wherein said extraction mass concentration is greater than about 2 wt %.

11. The method of claim 10, wherein said extraction mass concentration is greater than about 5 wt %.

12. The method of claim 1, wherein said solid media are selected from the group consisting of inorganic material, carbon-based material, and mixtures thereof.

13. The method of claim 12, wherein said inorganic material is selected from the group consisting of silica, alumina, iron oxide, aluminum silicate, amorphous volcanic glass, and mixtures thereof.

14. The method of claim 13, wherein said inorganic material comprises activated alumina.

15. The method of claim 12, wherein said carbon-based material is selected from the group consisting of anthracite coal, carbon black, coke, activated carbon, cellulose, and mixtures thereof.

16. The method of claim 1, wherein said solid media are placed in an axial flow filter.

17. The method of claim 1, wherein said solid media are placed in a candle filter.

18. The method of claim 1, wherein said purification comprises contacting said second suspension with said solid media in a candle filter followed by an axial flow filter; and wherein said solid media of said candle filter comprise diatomaceous earth and said solid media of said axial flow filter comprise activated alumina.

19. The method of claim 1, wherein said solvent is n-pentane; wherein said crPE is crHDPE; wherein said extraction temperature is about 205° C. and said extraction pressure is about 1,900 psig (131 barg); wherein said dissolution temperature is about 140° C. and said dissolution pressure is about 1,900 psig (131 barg); wherein said settling temperature is about 140° C. and said settling pressure is about 1,900 psig (131 barg); wherein said purification temperature is about 140° C. and said purification pressure is about 1,900 psig (131 barg); and wherein said vlPE has L* greater than about 82, a* greater than about −3, b* less than about 5, and Y less than about 40%.

20. A method for purifying crPE to produce vlPE comprising:

a. Obtaining said crPE; wherein said crPE is selected from the group consisting of post-consumer recycled (PCR) polyethylene, post-industrial recycled (PIR) polyethylene, and combinations thereof, b. Extracting said crPE with n-pentane at an extraction mass concentration of about 3.5 wt %, at an extraction temperature of about 205° C., and at an extraction pressure of about 1,900 psig (131 barg) to produce an extracted contaminated reclaimed polyethylene (ecrPE);

c. Dissolving the ecrPE in n-pentane at a mass concentration of about 3.5 wt %, at a dissolution temperature of about 140° C., and at a dissolution pressure of about 1,900 psig (131 barg) to produce a first suspension comprising dissolved polyethylene (PE) and suspended particulate contaminants;

d. Settling said first suspension at about 140° C. and at about 1,900 psig (131 barg) to produce a second suspension comprising dissolved PE and suspended remaining particulate contaminants;

e. Purifying said second suspension by contacting said second suspension with solid media at about 140° C. and at about 1,900 psig (131 barg) to produce a third suspension comprising purer PE; wherein said purification comprises contacting said second suspension with said solid media in a candle filter followed by an axial flow filter; and wherein said solid media of said candle filter comprise diatomaceous earth and said solid media of said axial flow filter comprise activated alumina; and f. Separating said purer PE from said third suspension; wherein said purer PE is said vlPE; and wherein said vlPE has L* greater than about 82, a* greater than about −3, b* less than about 5, and Y less than about 40%;

wherein step c comprises the use of processing aids.

21. The method of claim 20, wherein the processing aids comprise flocculation aids.

22. The method of claim 1, wherein the processing aids comprise flocculation aids.

* * * * *